United States Patent [19]

Schosser

[11] Patent Number: 4,818,928
[45] Date of Patent: Apr. 4, 1989

[54] BATTERY PACK

[75] Inventor: John F. Schosser, New Fairfield, Conn.

[73] Assignee: Duracell Inc., Bethel, Conn.

[21] Appl. No.: 103,622

[22] Filed: Oct. 1, 1987

[51] Int. Cl.$^4$ .......................... H02J 7/00; H01M 2/10
[52] U.S. Cl. ........................................ 320/2; 320/13; 429/99
[58] Field of Search ........................ 320/2–6, 320/15–18, 13, 7; 429/99

[56] References Cited

U.S. PATENT DOCUMENTS

| 1,583,517 | 5/1926 | Barany | 320/18 X |
| 2,353,410 | 7/1944 | Marshall et al. | 320/18 |
| 3,828,201 | 8/1974 | Allen, Sr. | 320/16 X |
| 3,975,670 | 8/1976 | McDermott | 320/18 X |
| 4,175,846 | 11/1979 | Nozawa et al. | 320/15 X |
| 4,698,578 | 10/1987 | Mullersman et al. | 320/18 X |

Primary Examiner—R. J. Hickey
Attorney, Agent, or Firm—Ronald S. Cornell; James B. McVeigh

[57] ABSTRACT

This invention pertains to portable battery-pack power supplies for use in devices which must be operated between an upper voltage and a lower voltage limit. The battery pack is comprised of a main power supply and a reserve power supply. The reserve power supply is switched into series connection with the main power supply when said main power supply is discharged to the lower voltage limit. Means are provided for ensuring that only the initial power supply is switched into the circuit after fresh cells are installed in the battery pack.

7 Claims, 2 Drawing Sheets

BATTERY PACK

This invention pertains to portable, battery-pack, power supplies and, more specifically, to such battery-packs which are intended to be used in devices which operate between upper and lower voltage limits.

Many electronic devices are operated by a battery-pack power supply. These devices are frequently comprised of electronic circuitry which can be damaged if connected to a battery power supply which exceeds an upper voltage limit. Thus, a battery-pack should have a maximum voltage which does not exceed the upper voltage limit of the electronic device in which it is to be used. Some devices are used in applications where it is desirable that the battery-pack which powers the device lasts a certain minimum time. It is, of course, possible to increase the time during which a battery-pack is useful by increasing the size of all the cells, but this adds substantial undesirable weight which is intolerable in some applications such as portable, handheld camcorders. It will be readily understood by those skilled in the art that additional cells in series will increase the voltage to an unacceptable level; while providing two sets of batteries with the sets connected in parallel with each other has similar weight and volume characteristics as does the use of larger cells.

It has now been discovered that it is possible to greatly increase the life of a battery-pack by adding a few cells in series with the major number of cells after the initial, major number of cells has been partially discharged. To obtain this effect, multivoltage batteries have previously been known. For example, U.S. Pat. No. 2,449,811 discloses a multivoltage battery which can supply a range of voltages for operating a multitude of devices. One problem with this type of design is that it is possible to connect the battery to a device when the battery is set at an exceedingly high voltage for that particular device. Therefore, if such a battery is set at a voltage which exceeds the upper voltage limit when connected, the device can be permanently damaged. It is also possible in this arrangement to drive one or more cells into reversal, because the individual cells at any given time could be in different states of charge depending on past use of the battery. For example, if an application required the use of all of the cells, some cells could already have been partially used with the others being fresh. In such, and similar, instances the greater discharged cells could be driven into reversal by the lesser discharged cells.

Before the advent of solid state circuitry telephone exchange circuitry was sometimes protected against a power loss by use of a 50 volt lead-acid battery. These batteries were designed to operate at a constant current rate during outage periods of about 8 hours, the appropriate current rate being determined by the circuitry being operated. For example, circuitry requiring 100 amps to operate would need an 800 A-Hr lead acid battery in order to operate for 8 hours. Each of these batteries employed 23 individual cells floating across a charger having a voltage of 49.5 volts giving each cell a voltage of about 2.15 volts. The standard cutoff voltage for discharge of these lead acid cells is 1.75 volts per cell corresponding to a battery voltage of 40.25 volts. However, the battery could not be discharged to this voltage because the telephone exchange circuit operated erratically below about 45.5 volts. Therefore, it was customary to sequentially add three additional cells into series with the battery during discharge. By increasing the number of cells to 26 the cutoff voltage of the battery increased to 45.5 volts ($26 \times 1.75$). This permitted full discharge of the 23 cells during a period of 8 hours as opposed to inefficiently, partially discharging the 23 cell battery to 45.5 volts, which would not provide the needed operating time. The effect of adding the additional cells in this application was to raise the battery cutoff voltage to a value which was compatible with the telephone exchange circuitry while getting full capacity out of the original 23 cell battery during an 8 hour constant current discharge.

It is an object of the present invention to increase the operating time of of a battery powered device by increasing the number of cells in the battery-pack without exceeding the upper voltage limit of the device.

It is an additional object of this invention to provide a battery-pack having means for ensuring that the voltage initially applied to operate a device does not exceed the upper voltage limit.

It is an additional object of this invention to increase the operating time of a device powered by a battery-pack driven at a rate higher than the optimum rate for the cells in the battery pack.

It is an additional object of this invention to provide a battery-pack of alkaline-manganese dioxide cells which lasts longer than conventional battery packs having nickel-cadmium cells.

These and other objectives are attained by the present invention which provides a battery-pack comprising a main power supply, a reserve power supply, means to selectively switch the reserve power supply into a series connection with the main power supply, and means for ensuring that the initial voltage of the battery-pack does not exceed a predetermined upper limit. Initially the main power supply is connected to the battery-pack terminals. Means are also provided to prevent the reserve power supply from inadvertently, prematurely being placed in the circuit. When the voltage of the main power supply approaches a predetermined lower voltage limit the reserve power supply is added to the remaining voltage of the initial power supply. It has been discovered that the combination of the reserve power supply and the initial power supply surprisingly extends the operating time of the battery-pack above the predetermined lower limit for much longer than could be expected.

The present invention will now be described with reference to the figures in which.

Figure 1:
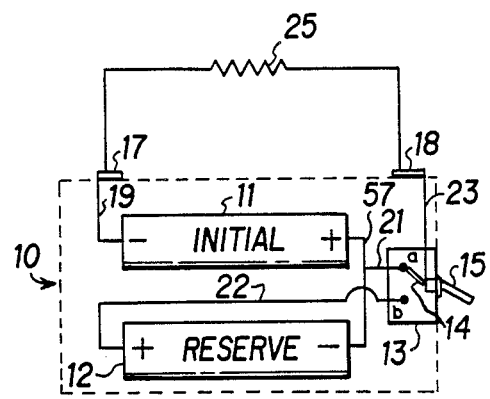
FIG. 1 is a schematic block diagram of a battery-pack designed in accordance with the present invention.
Figure 2:
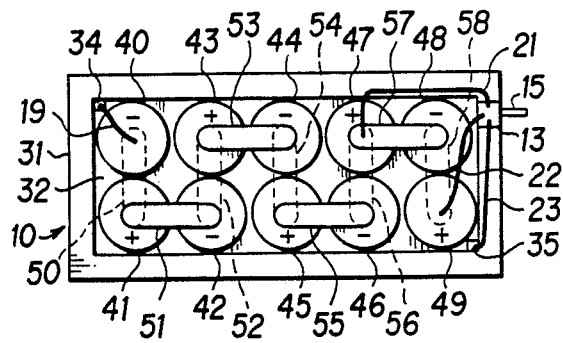
FIG. 2 is a top view of a battery-pack made in accordance with the present invention with the cover removed.

Referring now to FIG. 1, a battery-pack 10, indicated by the dashed line, is designed to operate a device, shown as load 25, between upper and lower voltage limits. The battery-pack is comprised of a main power supply 11 and a reserve power supply 12 adapted to be connected in series through switch 13. The main power supply 11 has an initial voltage which does not exceed the upper voltage limit. The reserve power supply 12 has an initial voltage which does not exceed the difference between the upper and lower voltage limits. Switch 13 has internal contact means 14 responsive to external lever 15 such that a first position of lever 15 causes internal contact means 14 to move to position 'a' which results in the voltage of the initial power supply 11 being applied to battery-pack terminals 17 and 18. Lever 15 can be moved to a second position which causes internal contact 14 to move to position 'b' which results in placing the reserve power supply 12 into series with the main power supply 11. The combined voltage of power supplies 11 and 12 is then applied to battery-pack terminals 17 and 18.

Structurally, battery pack 10 is comprised of a housing 31 having terminals 17, 18 and containing electrochemical cells 40–49. In the presently preferred embodiment, the main power supply 11 is comprised of cells 40–47 and the reserve power supply 12 is comprised of cells 48 and 49. The main power supply 11 is connected to the reserve power supply 12 through switch 13 and conductive element 57 as will be discussed below. The cells are connected in series by conductive elements 50–58. The negative end of the main power supply 11 is the negative end of cell 40 which is connected by conductive means 19 to contact 34. Contact 34 is electrically connected to terminal 17 (FIG. 1). The positive end of the main power supply 11 is the positive end of cell 47 which is connected by conductive element 57 and conductive means 21 to switch 13. The negative end of the reserve power supply 12 is the negative end of cell 48 and is connected by conductive means 57 to the positive end of the main power supply 11. The positive end of the reserve power supply is the positive end of cell 49 and is connected by conductive means 22 to switch 13. Switch 13 is connected by conductive means 23 to contact 35, and contact 35 is electrically connected to the positive external terminal 18 (FIG. 1) of the battery pack.

When switch 13 is in a first position the positive terminal of cell 47 is electrically coupled to terminal 18 and the reserve power supply 12 (cells 48–49) is outside the circuit. When the voltage of the initial power supply 11 reaches a predetermined lower voltage limit switch 13 is activated to a second position in which the positive terminal of cell 49 is electrically coupled by elements 22, 23 and switch 13 to external contact 18. Thus, the reserve power supply 12 is connected into series through element 57 to the main power supply 11.

Figure 3A:
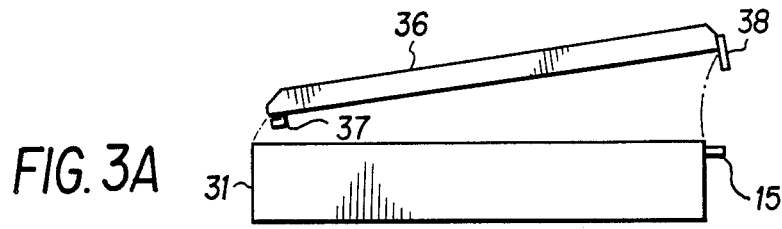
FIG. 3A is a side profile view of one embodiment of a battery pack.
Figure 3B:
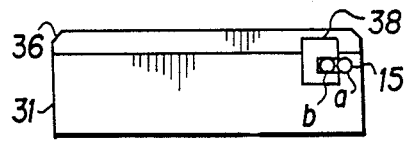
FIG. 3B is an end view of the battery pack of FIG. 3A.

Means are provided to ensure that the switch 13 is initially in position to connect only the main power supply 11 (first position) when the battery-pack is manufactured. Switch 13 is located at one end of battery pack 10. Cover 36 (shown lifted off housing 31 in FIG. 3A) has a latch 37 which is engaged in a mating element (not shown) in housing 31 before the cover 36 can snap in place. Cover 36 has member 38 attached thereto for ensuring that lever 15 is in the first position when cells are installed, said member 38 being located on cover 36 at the end opposite the tab 37. FIG. 3B shows how this arrangement operates. In order to be able to remove and replace cover 36, lever 15 must be in the first position 'a' as shown so that means 38 can clear lever 15 as the cover 36 is being lifted off or replaced. Thus, after cells have been installed the lever 15 is in the first position and only the main power supply 11 is connected to the device.

The advantages of the present invention will become evident upon consideration of the following examples.

EXAMPLE 1

Figure 4:
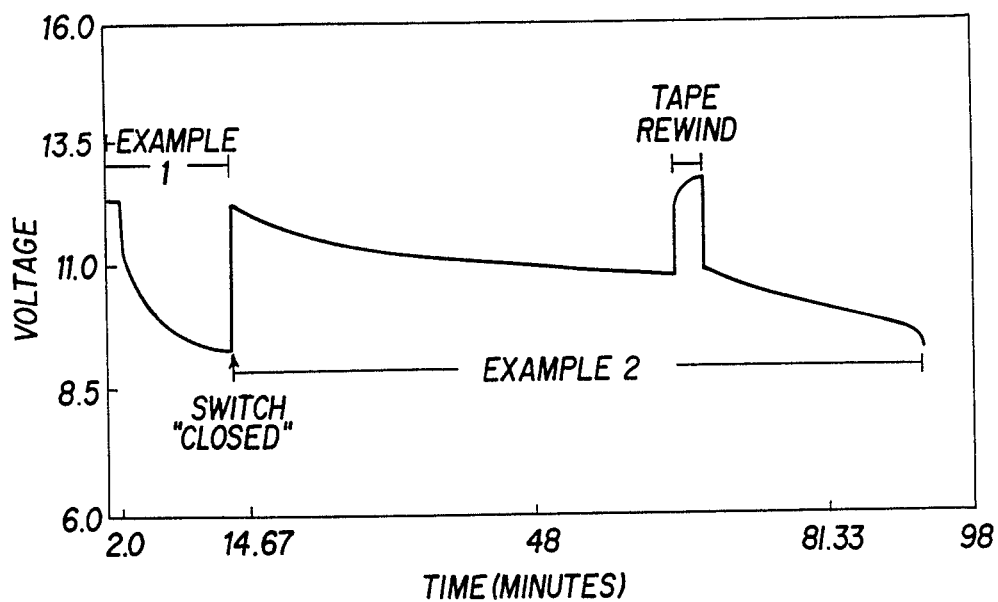
FIG. 4 is a voltage profile during discharge of a battery-pack made in accordance with the present invention.

A JVC VHSC camcorder, model No. GR-C7U, is conventionally operated by a battery-pack comprised of eight nickel cadmium cells connected in series. The battery-pack has a voltage of 9.6 volts and a rated capacity of 1000 mA-Hr. The camcorder is rated to have a voltage range of about 9 to 12 volts. This camcorder is provided with a view finder which indicates when the battery-pack has reached the lower voltage limit. The camcorder is also provided with a battery pack comprising eight AA alkaline-manganese cells connected in series. The battery pack has an initial voltage of about 12.6 volts. The camcorder is operated continuously in the record mode on slow speed following a 2 minute stand-by period. As shown in FIG. 4, when the camcorder is operated until the lower voltage limit is reached this battery pack is capable of operating the camcorder for about 11 minutes at which time the low-voltage indicator signal goes on.

EXAMPLE 2

Two additional AA alkaline manganese cells are then connected in series to the battery-pack of Example 1. FIG. 4 further depicts the voltage of the resulting ten cell battery-pack while continuing to operate the camcorder in the record mode on slow speed. This battery-pack operates the camcorder for 77 additional minutes before the low voltage indicator light goes on. As shown in FIG. 4 the one-hour video tape has to be rewound because the battery-pack lasted so long. A different battery pack is used for the rewinding, and the battery pack of this Example is reconnected thereafter. In this way the total record time for the ten cell battery pack is determined to be 90 minutes (2 minutes standby +11 minutes for the 8 cell main power supply plus 77 additional minutes for the full ten cells including the main power supply and the auxiliary power supply).

This invention permits the use of alkaline-manganese dioxide cells in battery packs which will last at least as long as conventional nickel-cadmium battery packs now in use. While the voltages are similar between these two cell types, nickel-cadmium cells in high rate applications take longer to reach the lower voltage limit due to their higher surface area electrodes but these cells are disadvantageous because they must frequently be recharged. The present invention permits the use of alkaline-maganese cells which will last as long, in some high rate applications, as nickel-cadmium cells but do not suffer from the inconvenience of having to be recharged. Thus, there is an advantage to the consumer that he does not have to wait to use his device while his cells are recharging nor does he have to purchase two sets of the more expensive nickel-cadmium cells in order to be able to continuously use his device while one set is recharging. Most, if not all, battery operated devices could use a battery-pack made in accordance with this invention. While the Examples demonstrate use with a camcorder, other devices such as flashlights, radios, cassette recorders, portable TV's and the like would experience extended operating time versus conventional battery pack use. The battery-pack power supply housing can be integrally associated with the device it operates. In such embodiment, part of the device acts as the housing of the battery-pack.

Alternatively, the battery-pack could be modular. The cells comprising the main and reserve power supplies could be contained within a rigid housing together with the switch, all suitably connected together. Rather than engaging directly with the device as described in the Examples, the modular battery pack could be remote from the device while being electrically connected thereto by a suitable power cord.

The description and the specific Examples are intended to be illustrative of the presently disclosed invention. It is to be understood that changes can be made and still remain within the scope of the presently disclosed invention.

What is claimed is:

1. A battery-pack power supply which operates between upper and lower voltage limits, said battery-pack comprising a plurality of electrochemical cells connected to provide a main power supply having a voltage which does not exceed a predetermined upper voltage limit and a reserve power supply having a voltage which does not exceed the difference between the upper and lower voltage limits; switch means in said battery pack for interconnecting in a first position only the main power supply into an electronic circuit to be powered by said battery-pack and, alternately for connecting in a second position both the reserve power supply the circuit and the main power supply into the electronic circuit to be powered by the battery-pack; and means for ensuring that the switch means is in the first position when cells are installed in the battery-pack whereby only the main power supply becomes interconnected upon installation.

2. A battery-pack power supply for operating a device, wherein said device operates between upper and lower voltage limits, said battery-pack comprising a housing having a removable cover; first and second external terminals mounted on said housing; a main power supply contained within the housing and comprising one or more electrochemical cells having a combined voltage which does not exceed the upper voltage limit wherein said main power supply has first and second terminals, and said first terminal being connected to the first external terminal of the battery-pack; a reserve power supply contained within the housing and comprising one or more electrochemical cells having a combined voltage which does not exceed the difference between the upper and lower voltage limits, said reserve power supply having first terminal and second terminals; a switch having a first position and a second position, said switch being operatively connected to the main power supply, the reserve power supply, and the second external terminal of the battery-pack, whereby in the first position of the switch, the second terminal of the main power supply is connected to the second external terminal of the battery-pack, and in the second position of the switch the first terminal of the reserve power supply is connected to the second terminal of the main power supply and the second terminal of the reserve power supply is connected to the second external terminal of the battery-pack; and means for preventing installation of the cells in the battery-pack unless the switch is in the first position.

3. The battery-pack of claim 2 wherein the cells are primary cells.

4. The battery-pack of claim 2 wherein the cells are alkaline manganese cells.

5. The battery-pack of claim 4 wherein said switch is a single pole, double throw switch.

6. In combination a battery-pack power supply and a camcorder which is adapted to operate between an upper voltage limit of about 12 volts and a lower voltage limit of about 9 volts, said battery-pack comprising a housing; a cover for the housing; first and second external terminals mounted on said housing; a main power supply contained within the housing comprising eight AA alkaline-manganese cells having a combined voltage of about 12 volts; a reserve power supply contained within the housing comprising two AA alkaline-manganese cells having a combined voltage of three volts; and switching means having first position and second positions, said switching means being operatively associated with the main power supply, the reserve power supply, and the external terminals of the battery-pack to provide a first position in which the switching means connects the main power supply to the external terminals of the battery-pack, and a second position in which both the main and reserve power supplies are connected in series to the external terminals of the battery-pack.

7. The combination of claim 6 and further including a member attached to the cover which engages with the switch such that the switch must be in the first position while the cover is removed orreplaced thus ensuring that only the main power supply is initially connected to the external terminals of the battery-pack when fresh cells are installed.

* * * * *

UNITED STATES PATENT AND TRADEMARK OFFICE
CERTIFICATE OF CORRECTION

PATENT NO. : 4,818,928
DATED : April 4, 1989
INVENTOR(S) : John F. Schosser

It is certified that error appears in the above-identified patent and that said Letters Patent is hereby corrected as shown below:

Column 2, line 14, correct duplicate occurrence of the word "of".

Column 6, line 45, "orreplaced" should read -- or replaced --.

Signed and Sealed this

Twenty-fourth Day of October, 1989

Attest:

DONALD J. QUIGG

Attesting Officer

Commissioner of Patents and Trademarks